G. S. BAKER.
MACHINE FOR STACKING, WEIGHING, AND FEEDING BISCUITS.
APPLICATION FILED JUNE 6, 1913.

1,108,117.

Patented Aug. 25, 1914.
4 SHEETS—SHEET 1.

Witnesses
C. A. Walter
L. G. Anger

Inventor
George Samuel Baker
by
Attorney.

G. S. BAKER.
MACHINE FOR STACKING, WEIGHING, AND FEEDING BISCUITS.
APPLICATION FILED JUNE 6, 1913.

1,108,117.

Patented Aug. 25, 1914.

4 SHEETS—SHEET 2.

Witnesses
C. A. Walters
L. G. Anger

Inventor
George Samuel Baker
by
Attorney

G. S. BAKER.
MACHINE FOR STACKING, WEIGHING, AND FEEDING BISCUITS.
APPLICATION FILED JUNE 6, 1913.

1,108,117.

Patented Aug. 25, 1914.
4 SHEETS—SHEET 3.

Witnesses
C. A. Walter
L. G. Anger

Inventor.
George Samuel Baker
by
Attorney

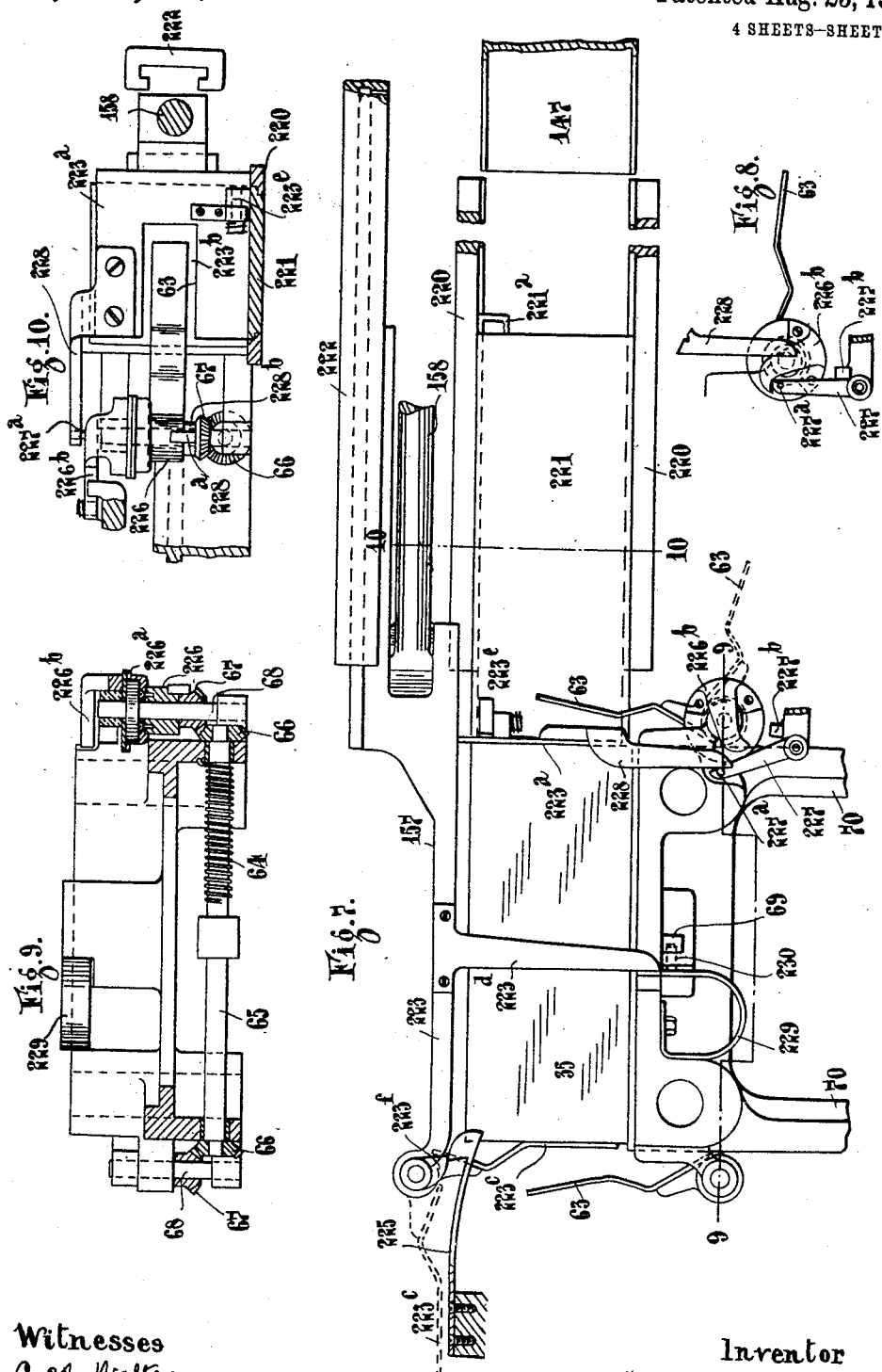

UNITED STATES PATENT OFFICE.

GEORGE SAMUEL BAKER, OF LONDON, ENGLAND.

MACHINE FOR STACKING, WEIGHING, AND FEEDING BISCUITS.

1,108,117. Specification of Letters Patent. Patented Aug. 25, 1914.

Application filed June 6, 1913. Serial No. 772,144.

*To all whom it may concern:*

Be it known that I, GEORGE SAMUEL BAKER, a subject of the King of England, residing at London, in England, have invented certain new and useful Improvements in Machines for Stacking, Weighing, and Feeding Biscuits, of which the following is a specification.

This invention relates to improvements in machines for stacking, weighing and feeding biscuits and the like.

In the machine constructed according to this invention, the biscuits are first placed haphazard in an oscillating tray from which they pass to endless belts provided with fingers or prongs, which, combined with a traveling brush, arrange the biscuits on end or in stacks and pass them to an electrically operated or controlled weighing device which automatically weighs or determines short weight of the biscuits which are then fed from the weighing device to be dealt with as desired. The whole machine is thrown out of action in case of an insufficient supply of biscuits to the weighing device and requires to be manually started again.

Figure 1:
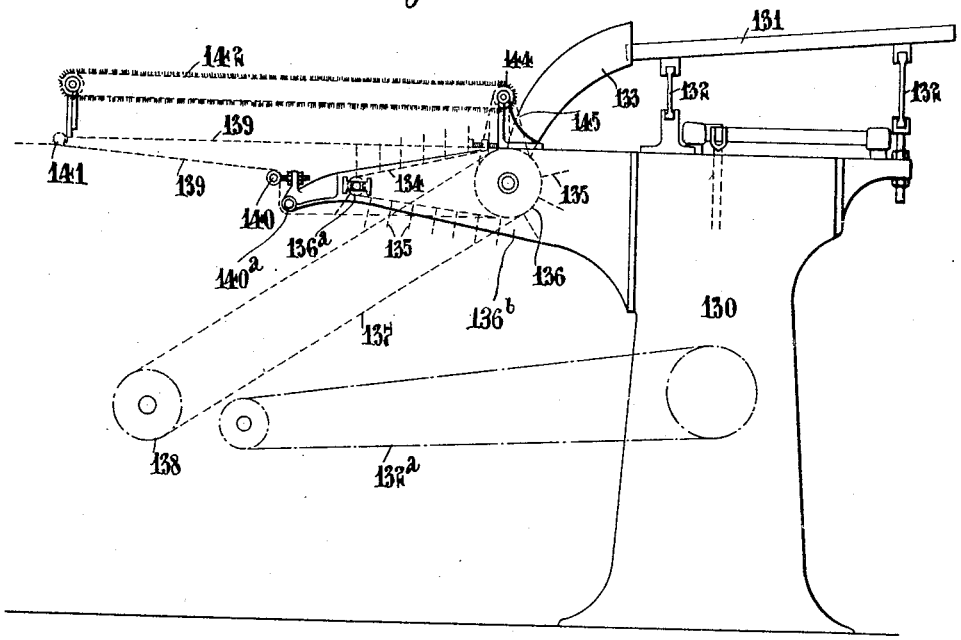
Figure 2:
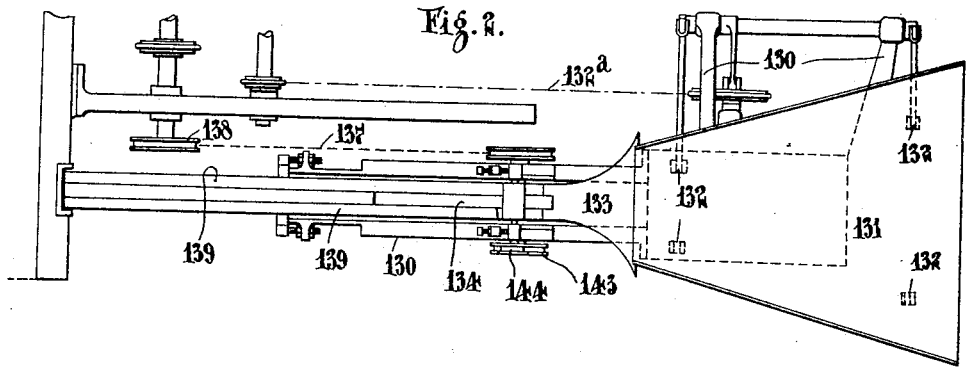
Figure 3:
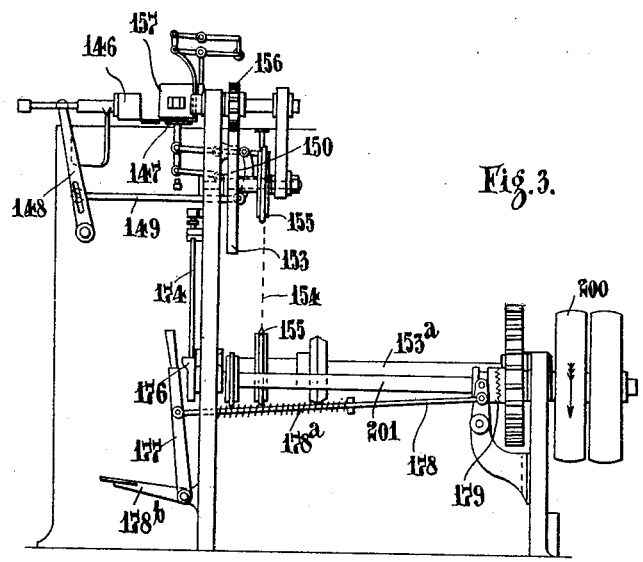
Figure 6:
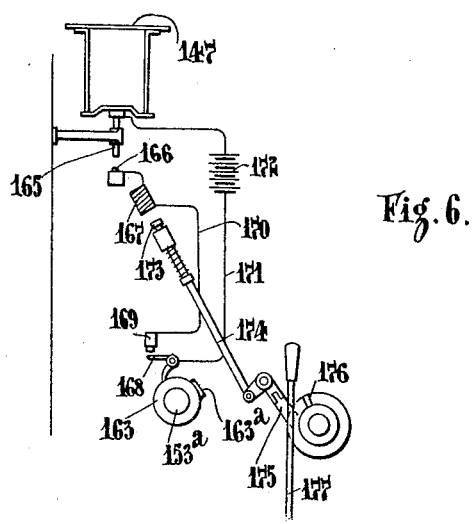
Figure 4:
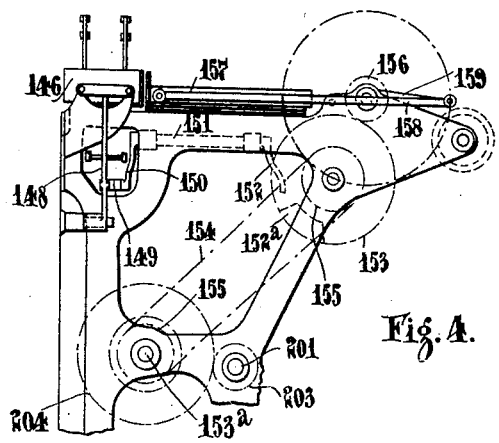
Figure 5:
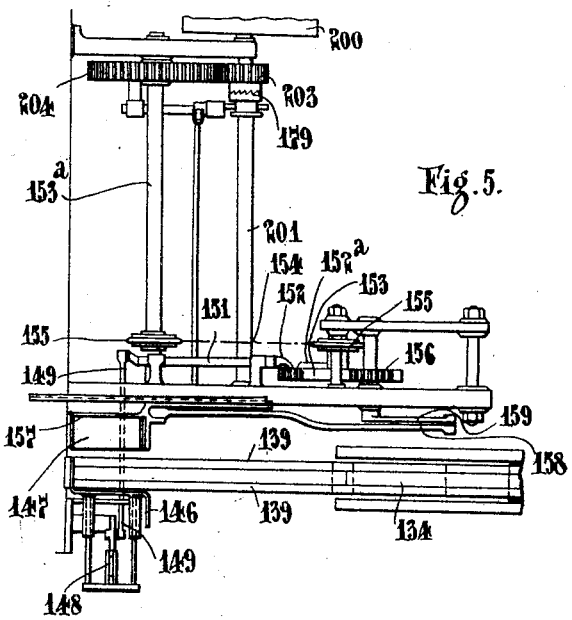

In the accompanying drawings, Figure 1 is a side view of the stacking device, and Fig. 2 a plan view thereof. Figs. 3, 4 and 5 are an end elevation, side elevation and plan respectively, of the weighing device. Fig. 6 is a detail view showing an electrically controlled mechanism for controlling the balance of the weighing device, and Figs. 7 to 10 detail views of a slide and coacting parts by which the biscuits are delivered from the weighing device, Fig. 7 being a plan view, Fig. 8 a detail view of parts shown in Fig. 7, Fig. 9 a section on the line 9—9 of Fig. 7, and Fig. 10 a section on the line 10—10 of Fig. 7.

Referring to Figs. 1 and 2, the stacking attachment comprises a standard 130 carrying at one end an inclined feed tray 131 mounted on pivoted levers 132 adapted to be rocked by any suitable mechanism operated by drive 132$^a$ to impart a shogging motion to said tray. The tray 131 is adapted to discharge the biscuits placed haphazard thereon into a chute 133 which carries them onto a conveyer belt 134 provided with perpendicular plates 135, and traveling around pulleys 136, 136$^a$ mounted in arms 136$^b$ extending from the standard 130 and driven by pulley and belt gear 137, 138. The said belt 134 passes between two other conveyer belts 139, 139 passing over pulleys 136, 140, 140$^a$ and 141, and the plates 135 on said belt 134 impart to the biscuits a vertical position on the lateral belts 139 which position is maintained by the endless brush 142 traveling at the same speed and in the same direction as the belts 139. The brush 142 is driven from the belts by means of pulleys 143, 144 and chain 145.

From the stacking attachment described the biscuits are passed to the weighing attachment which is as follows, reference being made to Figs. 3 to 6. The biscuits on the belts 139 (Fig. 5) are fed by the transversely movable feed plate 146 onto the balance 147. The said plate is operated by the lever 148 and connecting rod 149, lever 150, rocking shaft 151, catch lever 152 and a cam-piece or surface 152$^a$ on the continuously rotating half toothed wheel 153 driven from the shaft 153$^a$ by chain and pulley gear 154, 155. The said wheel 153 is in gear with a wheel 156 in the ratio of three to one, said wheel 156 operating the feed slide or box 157 (hereinafter fully described with reference to Figs. 7 to 10 to feed the biscuits from the balance 147) by means of connecting rod 158 and crank 159 in such a manner that biscuits are fed intermittently.

The actual weighing device is electrically operated and represented in Fig. 6 and is so constructed that if insufficient biscuits, according to a predetermined weight, are fed to the balance 147 a clutch is caused to be thrown out of gear and the machine stopped. A time cam 163 is provided on the shaft 153$^a$ having a cam surface 163$^a$. So long as the weight of the biscuits on the balance is correct a contact 165 on the stem of the balance engages a contact 166 in a circuit containing a solenoid 167 and the cam 163 in its rotation will act upon a contact maker 168 to engage a contact 169 so that the circuit 170, 171 containing battery 172 is closed and an armature 173 on the end of a rod 174 is attracted by the solenoid and said rod acts on a bell crank 175 normally lying between a lever 177 (connected to clutch 179 by means of a rod 178) and a cam 176 to remove said bell crank so that the cam has no effect on the lever and the clutch 179 remains in gear as shown in Fig. 3. Should, however, the weight be insufficient the circuit remains open, the rod 174 is not attracted and the bell crank 175 remains between the cam 176 and lever 177 in which position the cam entering between the bell crank and lever moves the lever on its fulcrum to disengage the clutch and thus stop the machine. The clutch is normally held in engagement by a spring 178$^a$ on rod 178 and may, when necessary, be thrown out of gear by means of a pedal 178$^b$ shown in Fig. 3.

The weighing device is actuated from the pulley 200 on a shaft 201 carrying loosely a gear 203 having integral therewith one portion of a clutch 179, the companion portion of which is splined to a shaft 201. The gear 203 meshes with a gear 204 on a shaft 153$^a$. After the weighing the biscuits are fed forward by the slide or box 157 before referred to, for example onto a holder 35 mounted on a reciprocating carriage 70 in a wrapping machine which is fully described in the specification of my application dated concurrently herewith, Serial No. 728,206. Reference is directed to Figs. 7 to 10. Between the weighing balance 147 and the holder 35 there is provided a pair of guides 220 in which slides a plate 221 adapted to support the biscuits. The slide 157 (see also Fig. 4) works in a guide 222 and comprises the side member 223, back-end plate 223$^a$ having a cut away portion 223$^b$, and front-end plate or clip 223$^c$ pivoted to the member 223. This latter also carries an arm 223$^d$, the purpose of which is hereinafter explained, and the back-end plate carries a spring catch or trip 223$^e$ which is adapted to engage a loop 221$^a$ of the plate 221 to move the plate between the balance 147 and holder 35 during the reciprocating movements of the slide 157 and to release said plate 221 when the latter reaches the end of its travel in either direction. On the pivot of the front-end plate 223$^c$ is a trip hook 223$^f$ adapted when the slide is in the position illustrated in Fig. 7 to be engaged by a spring catch 225.

63 designate biscuit clips of the holder 35 as described in the aforesaid application, these clips 63 being adapted to grip the ends of the biscuits, the resilient action of said clips being produced by a torsion spring 64 coiled about a shaft 65 provided at each end with a bevel wheel 66 which meshes with another bevel wheel 67 mounted on a spindle 68 each carrying one of the clips. There is mounted on one of the spindles 68 carried by carriage 70 a sleeve 226 carrying a spring drum 226$^a$ tending to keep the right hand clip 63 in the position shown in full lines in Fig. 7, that is to say, lying substantially within the cut out portion 223$^b$ of the back-end plate 223$^a$ as shown in Fig. 10. The drum 226$^a$ is also in operative connection with a hook 226$^b$ and the frame of the machine carries a spring finger 227 having thereon a pin 227$^a$ adapted to engage said hook and also to be engaged by an arm 228 attached to the back-end plate 223$^a$. This sleeve 226 and bevel wheel 67 are adapted to be rotated together by means of intercoacting abutments 228$^a$ and 228$^b$ on the sleeve and pinion respectively but the sleeve is capable of rotation independently of the pinion for the purpose of permitting the clip to be moved into the position shown in broken lines in Fig. 7, or in full lines in Fig. 8.

The action of the parts above described is as follows:—The slide 157 is normally over the weighing balance 147 and receives the weighed stack of biscuits between the end plates 223$^a$ and 223$^c$. After the weighing is completed the slide moves toward the left in Fig. 7 taking with it the plate 221 by engagement of the spring catch 223$^e$ with the loop 221$^a$ until said plate abuts against the edge of the holder 35, whereupon the catch leaves the loop and the slide continues its movement to the left until it arrives in the position shown in said Fig. 7, by which time the biscuits have been deposited on the holder. To enable this to be effected it is necessary that the right hand clip 63 should be in the position shown in dotted lines. This is brought about during the return stroke of the carriage 70 by the spring finger 227 on the machine frame engaging the hook 226$^b$ on the carriage so that at the end of the return stroke the parts will be in the position shown in Fig. 8, in which position the hook 226$^b$ is in engagement with the spring finger 227 thus holding the clip open, but when the slide arrives in the position indicated in Fig. 7, the arm 228 engages the pin 227$^a$ of the spring finger 227 and forces the latter out of engagement with the hook 226$^b$ allowing the right hand clip under the action of the spring drum 226$^a$ to assume the position shown in full lines. 227$^b$ is an abutment for limiting the movement of the finger 227 in the right hand direction. The arm 223$^d$ carried by the side member 223 now engages a spring 229 having thereon a pin 230 which normally holds the rack 69 (referred to in the aforesaid application) in position in which the clips 63 are as indicated in full lines in Fig. 7. By such engagement of the arm 223$^d$ and spring 229 the rack is released and the spring 64 acts through the bevel wheels 66, 67, abutments 228$^a$ and 228$^b$ to bring the clips 63 into fully closed positions, thus gripping the biscuits. Simultaneously with the movements described the trip hook 223$^f$ has been engaged by the spring catch 225 so that on return movement of the slide toward the right the front-end plate 223$^c$ is moved into the position shown in dotted lines so as to allow the slide to return and leave the biscuits on the holder.

What I claim as my invention and desire to secure by Letters Patent of the United States is:—

1. In a biscuit machine, the combination of mechanism for automatically stacking biscuits, mechanism for weighing same, means for transferring stacked biscuits from the stacking mechanism to the weighing mechanism, a feeding device, and means for transferring weighed biscuits from the weighing mechanism to said feeding device.

2. In a biscuit machine, the combination of mechanism for automatically stacking biscuits, mechanism for weighing same including a balance, means for transferring stacked biscuits from the stacking mechanism to said balance, electrically controlled mechanism including a clutch controlled by the balance to positively stop the machine if a predetermined weight of biscuits is not transferred to the weighing mechanism, a feeding device and means for automatically discharging the biscuits from said balance to the feeding device.

3. In a biscuit machine, the combination of mechanism for feeding biscuits, mechanism for weighing the biscuits, and means for transferring weighed biscuits to the feeding mechanism, of mechanism for stacking the biscuits and feeding same to the weighing mechanism, said stacking mechanism comprising an oscillating tray, a chute into which the biscuits are deposited from said tray, an endless pronged traveling band receiving the biscuits from said chute, an endless feed belt at each side of said pronged belt, and an endless traveling brush coacting with said pronged belt to maintain the biscuits in a vertical position on said feed belts.

4. In a biscuit machine, the combination of an oscillating tray, a chute into which the biscuits are deposited from said tray, an endless pronged traveling band receiving the biscuits from said chute, an endless feed belt at each side of said pronged belt, means for maintaining the biscuits in a vertical position on said feed belts, a balance adjacent said feed belts, and means for forcing the biscuits off said belt onto said balance.

5. In a biscuit machine, the combination of an oscillating tray, a chute into which the biscuits are deposited from said tray, an endless pronged traveling band receiving the biscuits from said chute, an endless feed belt at each side of said pronged belt, means for maintaining the biscuits in a vertical position on said feed belts, a balance adjacent said feed belts, means for forcing the biscuits off said belt onto said balance, and mechanism controlled by said balance to stop the machine if insufficient biscuits are fed to said balance.

6. In a biscuit machine, the combination of an oscillating tray, a chute into which the biscuits are deposited from said tray, an endless pronged traveling band receiving the biscuits from said chute, an endless feed belt at each side of said pronged belt, means for maintaining the biscuits in a vertical position on said feed belts, a balance adjacent said feed belts, means for forcing the biscuits off said belt onto said balance, and a reciprocating slide for conveying the biscuits from said balance.

7. In a biscuit machine, the combination of an oscillating tray, a chute into which the biscuits are deposited from said tray, an endless pronged traveling belt receiving the biscuits from said chute, an endless feed belt at each side of said pronged belt, means for maintaining the biscuits in a vertical position on said feed belts, a balance adjacent the delivery end of said feed belts, means for laterally transferring the biscuits from said feed belts onto said balance, electrically controlled mechanism actuated by said balance to stop the machine if insufficient biscuits are fed to said balance, and a reciprocating slide adapted to remove the biscuits from said balance.

8. In a biscuit machine, the combination of an oscillating tray, a chute into which the biscuits are deposited from said tray, an endless pronged traveling belt receiving the biscuits from said chute, an endless feed belt at each side of said pronged belt, means for maintaining the biscuits in a vertical position on said feed belts, a balance adjacent the delivery end of said feed belts, means for laterally transferring the biscuits from said feed belts onto said balance, electrically controlled mechanism actuated by said balance to stop the machine if insufficient biscuits are fed to said balance, a feed device having spring clips adapted to grip the biscuits, a reciprocating slide adapted to transfer the biscuits from said balance to the feed device, and means actuated by said slide for controlling the movements of said spring clips.

In witness whereof I have signed this specification in the presence of two witnesses.

GEORGE SAMUEL BAKER.

Witnesses:
HERBERT D. JAMESON,
W. E. ROGERS.

Copies of this patent may be obtained for five cents each, by addressing the "Commissioner of Patents, Washington, D. C."